Dec. 6, 1960  L. PÉRAS  2,963,116
DISC-BRAKE

Filed Sept. 16, 1957  3 Sheets-Sheet 1

Dec. 6, 1960 L. PÉRAS 2,963,116
DISC-BRAKE
Filed Sept. 15, 1957 3 Sheets-Sheet 2
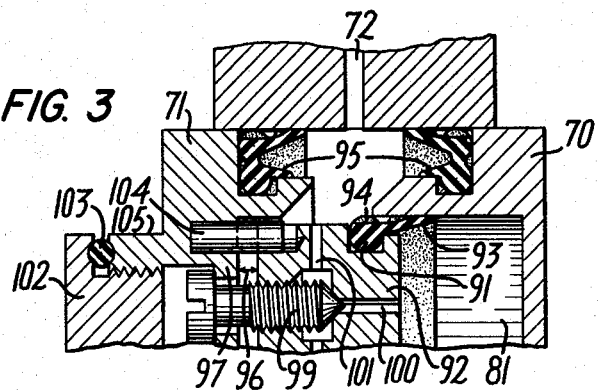
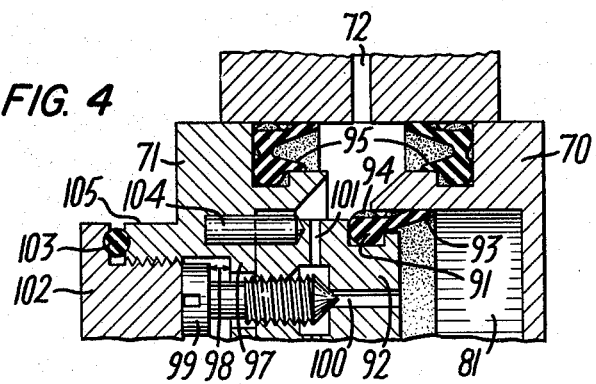
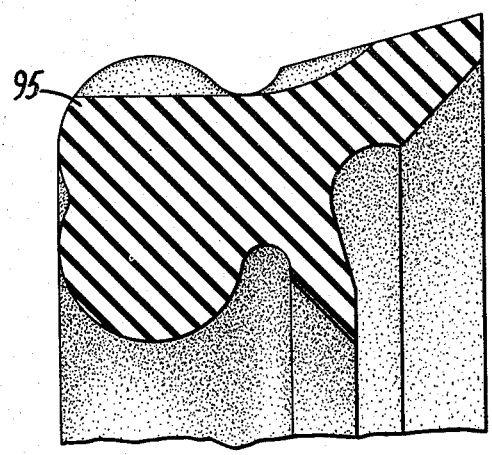

United States Patent Office 2,963,116
Patented Dec. 6, 1960

2,963,116

DISC-BRAKE

Lucien Péras, Billancourt, France, assignor to Regie Nationale des Usines Renault, Billancourt (Seine), France Filed Sept. 16, 1957, Ser. No. 684,127

Claims priority, application France Nov. 15, 1956

4 Claims. (Cl. 188—73)

In the prior U.S. Patent application Serial No. 588,641, filed on June 1, 1956, now Patent No. 2,946,408, granted July 26, 1960, the same applicant has described a disc brake for automotive vehicles wherein the disc consists of two coplanar concentric annular members forming therebetween an annular gap for the passage of other members for connecting the pressure plates or like members to the friction plates carrying the linings.

Moreover, the braking of the wheel-driven discs is provided between a fixed lining and a movable lining, the discs being in this case solid with the rotating wheel but with a certain lateral play in their support.

It is the object of the present invention to provide an improvement in disc brakes of this general character whereby the two discs are secured permanently on the wheel-hub forming member or on the member solid with this hub, the two linings becoming movable under the influence of a clamping device adapted to cause them to engage the two faces of the discs. This device comprises notably two pistons between which the pressure fluid is adapted to be fed, the pistons being so disposed that one engages directly one lining while the other pulls the opposite lining through the medium of a yoke.

As the clamping assembly possesses a certain axial play relative to its stationary support, this arrangement permits of easily compensating a possible warping of the discs. Moreover, a hydraulic device mounted between the two pistons permits of compensating lining wear by constantly providing a constant release clearance between the linings.

In any case, the specific features and advantages of this invention will become more apparent as the following description proceeds with reference to the accompanying drawings forming part of this invention and illustrating diagrammatically by way of example the manner in which the same may be carried out in the practice. In the drawings:

Figures 3 and 4 are axial fragmentary views of a modified embodiment of the hydraulic device for compensating lining wear;

Figure 5 is a fragmentary diametral section showing a piston packing.

Figure 1:
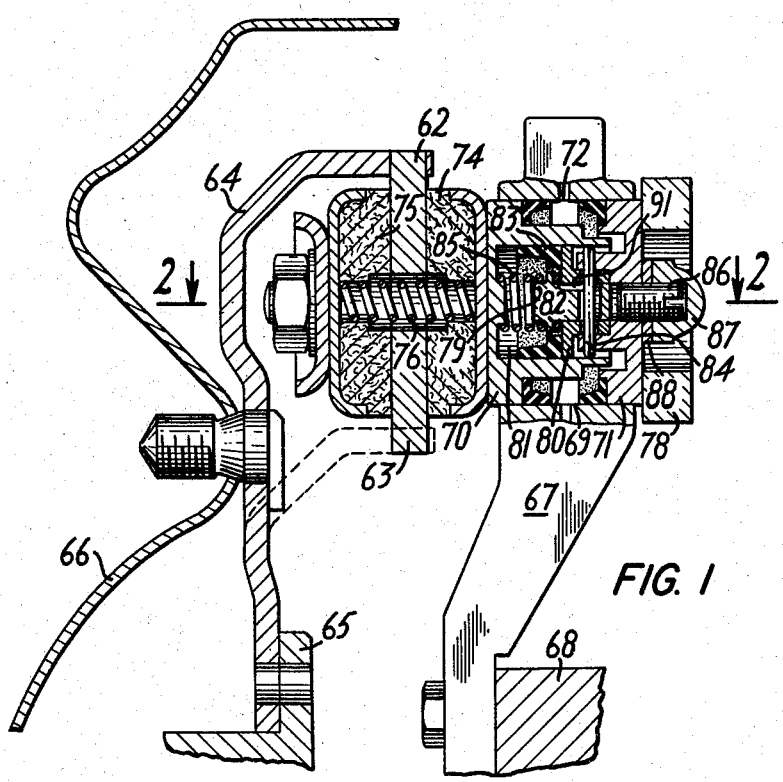
Figure 1 is a fragmentary sectional view of the disc brake, the sectional plane passing through the axis of the wheel and clamping device.

Referring to the drawings and more particularly to Fig. 1, the embodiment shown therein by way of example comprises a disc consisting of two annular elements 62, 63 disposed in a common vertical plane and leaving an annular space therebetween.

The driving plate 64 solid with the wheel hub 65 is rigidly secured on the annular elements 62, 63 by the bolting, upsetting, welding or any other suitable method, this assembly rotating bodily with the wheel 66. The elements 62 and 63 are two annular, concentric discs situated in the same vertical plane, and having said annular space between them, and are advantageously produced by edge-bending sheet or strip metal, and welding two half-circumferences. These discs are driven with the wheel by the piece 64 which connects the wheel to the hub as indicated heretofore. This piece comprises arms terminating in curved-back projections 47 engaging and secured in notches 48 provided in the discs 62 and 63.

Figure 6:
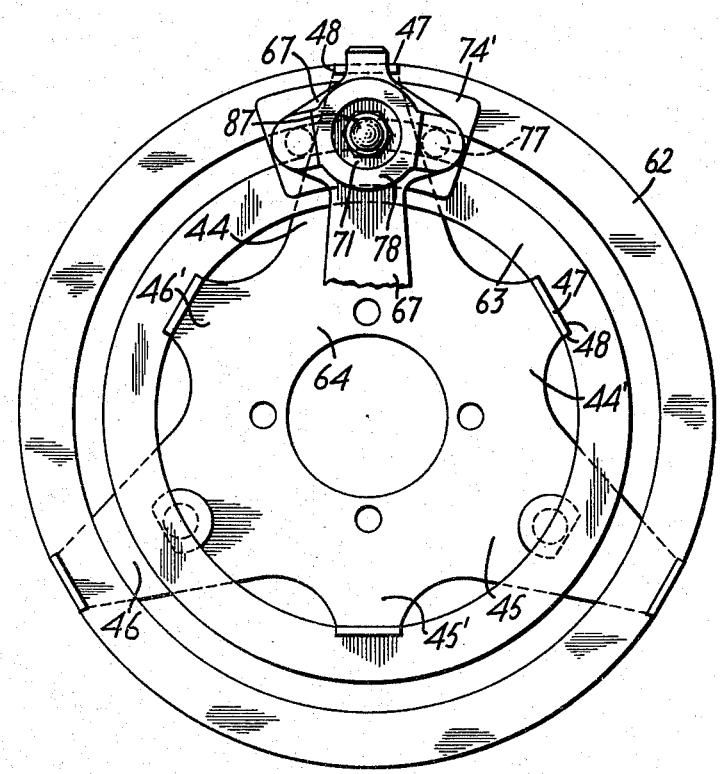
Fig. 6 is an elevation view showing the manner in which the disc brake, according to the invention, is mounted.

In the form illustrated, Fig. 6, the long arms 44, 45, 46 support the outer disc 62, while the short arms 44', 45', 46' support the inner disc 63. Each disc 62, 63 is centered by the three projections which drive it.

Linings 74 and 75 provided with backing plates 74' and 75' are situated respectively on each side of the discs in such a way as to be able to rub against them. They may be pressed against the discs by a hydraulic cylinder having a piston and provided with a device for taking up play as later herein described.

These linings are preferably shaped similar to the profile of a crown so that the pressure surface is substantially proportional to the radius of action, in such a way as to equalize wear (see Fig. 6).

The clamping device is mounted in a support 67 solid with a stationary part 68 of the wheel support. This support 67 comprises a bore 69 in which are slidably fitted a pair of pistons 70, 71 responsive to the hydraulic pressure of a fluid supplied through an orifice 72, these pistons having a certain axial clearance 73 (Fig. 2) on either side of the support 67. The two friction pads or linings 74, 75 engage the discs 62, 63 when the pistons 70, 71 are subjected to hydraulic pressure and against the resistance of springs 76 normally urging the discs away from each other.

The backing plate 74' of the lining 74 is in direct contect with the piston 70, and the backing plate 75' of the other lining 75 receives its thrust through the medium of parallel rods or a pair of bolts 77 and of a yoke member 78 engaged directly by the piston 71, as shown, the two bolts 77 extending freely through the support 67, the lining 74 and the annular gap provided between the discs.

The hydraulic device for compensating the lining wear comprises a non-return valve 79 the shank of which is slidably fitted in a bore formed centrally of a partition member 80 movable in turn in a bore 81 of piston 70. The non-return valve 79 and partition 80 are provided with packings 82, 83, as shown. The non-return valve 79 is solid through a pin 84 with the piston 71, with a certain clearance, this pin 84 being also adapted to carry along with play the partition member 80, the clearance between the valve and pin being greater than that between the partition member 80 and the same pin.

A spring 85 constantly urges the valve 79 against the partition 80 by bearing against the piston 70.

An adjustment screw 86 the purpose of which will be explained presently co-acts with the end of the valve 79 and is normally locked by a nut 87 engaging a washer 88. A lever 89 solid with the hand-controlled brake linkage carries a large-pitch screw-threaded portion 90 engaging the yoke 78 and adapted when rotated to exert a pressure against the piston by engaging the yoke 78.

This brake assembly operates as follows:

When the fluid under pressure is delivered through the orifice 72 to the space between the pistons, the piston 70 presses one lining 74 and the piston 71 pulls the other lining 75 through the intermediary of the bolts 77, thus clamping the discs between these linings and producing the brake application.

When the pressure exerted between the two pistons is released, the return spring 76 releases the clamping action produced between the linings and its action tends to move the pistons toward each other.

The hydraulic device placed between the two pistons 70 and 71 limits the clamping action to a uniform quantity so as to compensate the lining wear, this self-adjustment feature obtaining as follows:

During a brake application, the piston 71 carries along the partition member 80 through the pin 84 and as a result of the play provided between this pin and the partition member 80 the distance between this partition and the piston 71 is greater when the pressure moves the two pistons away from each other than when the spring 76 moves them towards each other. The valve 79 tends to open due to the pressure of the fluid as the latter can penetrate through the axial groove 91 and as considerable clearances are provided in the operative connection between the piston 71 and partition member 80, in the chamber 81 the volume of which is susceptible to increase upon a brake application and according to the lining wear.

When the brake is released the spring 76 urges the linings 74, 75 to their inoperative positions, the lining 74 engaging the piston 70 and exerting a pressure on the fluid in chamber 81 to urge the valve against the partition 80 while moving this partition towards the piston 71 within the limits permitted by the clearance with which the pin 84 is mounted. Thus, an equivalent and constant release of the linings relative to the discs can be introduced in the device, the lining wear being gradually taken up by the increase in the volume of the chamber 81.

When the hand-actuated brake control is used, the lever 89 during its rotation exerts through the medium of the large-pitch screw-threaded portion 90 a pressure on the piston 71 which is transmitted through the fluid-filled chamber 81 to the piston 70 and lining 74, while the reaction produced on the yoke 78 is transmitted through the bolts 77 to the lining 75 so that the latter is clamped with an equivalent force.

Of course, when the worn linings are replaced by new ones, it is necessary to restore the volume of the compensation chamber 81 to its initial value, and in this case the lock nut 87 is removed to permit the adjustment of the screw 86 for moving the non-return valve 79 to the extent necessary to enable one portion of the liquid to escape from the chamber 81.

It will also be noted that the axial clearance 73 of the complete clamping device relative to the support 67, while being limited on the one side by the yoke 78 and on the other side by the lining 74, enables the device to easily absorb any possible and reasonable amount of warping of the discs.

According to a modified embodiment of the hydraulic device for compensating lining wear (Figs. 3 and 4) a rubber or like packing 91' surrounding the partition member 92 movable within the piston 70 is substituted for the variable-capacity chamber 81. This packing is formed on the one hand with an outer peripheral lip 93 engaging the bore formed in the piston 70 and on the other hand with axial splines or grooves 94 for the passage of fluid, these splines or grooves 94 being so arranged that the fluid can flow into the chamber but cannot escape therefrom at the level of this packing.

The pistons 70 and 71 are provided on the registering outer peripheral edges with piston packings 95 of resilient, adequate material, having two heels and two lips, these piston packings being mounted in a pre-stressed condition and shown in their released condition and on a considerably larger scale in radial section in Fig. 5.

Figures 3 and 4 illustrate the device in its operative condition and released condition, respectively. In these figures, it is apparent that in this embodiment the release clearance available upon completion of the brake application is equivalent to the clearance 96 existing between the partition 92 and the shoulder 97 of piston 71 when the pistons are moved away from each other (Fig. 3), this clearance being subordinate to the clearance 98 available when the pistons are close to each other (Fig. 4) between said shoulder 97 and the head of an adjustment screw 99 solid with the partition 92. As in the preceding case, the lining wear is absorbed by the permissible increase in the volume of chamber 81.

The adjustment screw 99 has a conical point engaging the central orifice of partition 92 and when it is screwed out it permits the escape of part of the liquid contained in chamber 81 through the orifices 100 and 101 as required in case of lining replacement. The bottom of piston 71 is sealed by a plug 102 provided with a gasket 103. To permit the adjustment of the screw 99 the partition 92 is held against rotation relative to the piston 71 by using a positioning pin 104, this piston 71 being held in turn by a square-sectioned projection 105 or by means of studs.

Figure 2:
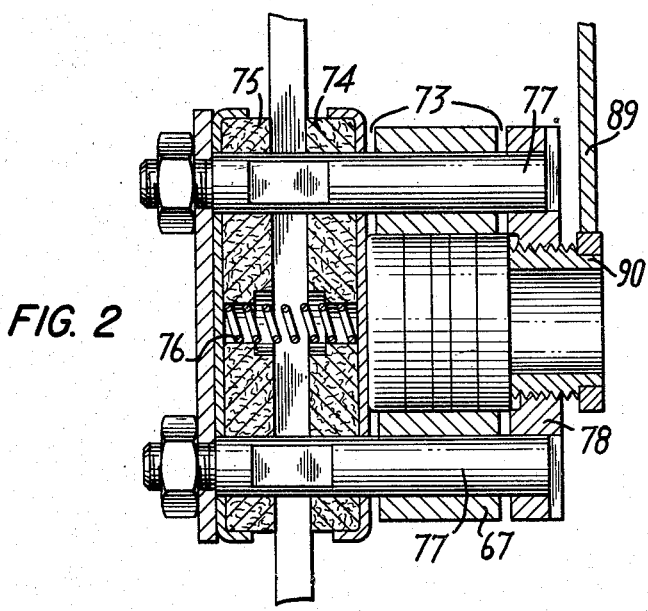
Figure 2 is a section taken upon the plane II—II of Fig. 1, showing a hand-control device.

A hand-actuated brake control device similar to that shown diagrammatically in Fig. 2 may be provided and it will be readily understood, notably from the arrangement of Fig. 4, that a pressure exerted on the piston 71 will be transmitted directly to the piston 70 through the fluid-filled chamber 81 and therefore to one of the linings, the other lining being displaced by the reaction on the yoke which results from the actuation of the control lever.

It will be readily understood that any other hydraulic or mechanical adjustment device (which may also be of the wedging, pawl or screw type for example) may be used without departing from the scope of the invention, that is, without altering the structural characteristics of the disc brake according to this invention.

I claim:

1. In a fluid-operated disc brake assembly for a wheel, in combination, at least one annular friction disc rotatable with the wheel, means having at least three angularly, spaced arms disposed equally spaced from one another fixing the disc to the wheel so as to rotate therewith, friction pads disposed on opposite faces of said brake disc and laterally displaceable in a direction axially of the wheel, a fixed brake housing straddling a portion of said disc and provided with a space forming a brake operating cylinder, the housing having oppositely disposed axially movable elements operable to displace the pads axially into engagement with the disc, dual operators selectively operable for displacing the displaceable friction pads axially of the wheel thereby to frictionally engage the pads and the brake disc to brake the wheel, said operators comprising a pair of fluid-operated opposed pistons operable in said cylinder for selectively applying axially directed pressure to said displaceable pads to brake the wheel, said movable elements comprising backing plates disposed opposite one another with the pads disposed between them, said pistons being operable in opposite directions under application of fluid braking pressure to the cylinder, the first of said pistons being disposed for operably engaging the first of said backing plates for moving it toward the second backing plate when fluid pressure is applied to the cylinder, a pair of spaced, parallel connecting rods connecting the second backing plate to the second piston for moving the second backing plate toward the first backing plate, means for applying a braking fluid pressure selectively to the cylinder, and means cooperating with said pistons for automatically maintaining a selected normal axial clearance between the disc and the displaceable friction pads when the brake is inoperative.

2. In a fluid-operated disc brake assembly for a wheel according to claim 1, in which the second operator comprises manually operated means for selectively displacing said second piston in a direction for causing frictional engagement of the displaceable friction pads with the disc to brake the wheel.

3. In a fluid-operated disc brake assembly for a wheel according to claim 1, in which the connecting rods are disposed on opposite sides of a path of reciprocable travel of said pistons.

4. In a fluid-operated disc brake assembly for a wheel according to claim 1, in which said means for automatically maintaining a selected normal axial clearance between the disc and the displaceable friction pads consists of an automatic hydraulic slack adjustor, comprising means defining a compensating chamber cooperative with said pistons in compensating for friction pad wear and for maintaining the travel of said pistons in said cylinder variable to maintain said selected normal axial clearance between the disc and the displaceable friction pads.

References Cited in the file of this patent

UNITED STATES PATENTS

| | | |
|---|---|---|
| 1,953,575 | Von Oberstadt | Apr. 3, 1934 |
| 2,201,571 | Aikman | May 21, 1940 |
| 2,255,974 | Hoyt | Sept. 16, 1941 |
| 2,366,093 | Forbes | Dec. 26, 1944 |
| 2,474,749 | Miller | June 28, 1949 |
| 2,497,438 | Butler | Feb. 14, 1950 |
| 2,689,024 | Trevaskis | Sept. 14, 1954 |
| 2,784,811 | Butler | Mar. 12, 1957 |
| 2,804,176 | Trevaskis | Aug. 27, 1957 |
| 2,815,830 | Oswalt | Dec. 10, 1957 |

FOREIGN PATENTS

| | | |
|---|---|---|
| 1,129,062 | France | Sept. 3, 1956 |
| 654,894 | Great Britain | July 4, 1951 |